(12) United States Patent
Mokeev et al.

(10) Patent No.: US 10,306,023 B2
(45) Date of Patent: May 28, 2019

(54) PRE-FORMED INSTRUCTIONS FOR A MOBILE CLOUD SERVICE

(71) Applicant: Oracle International Corporation, Redwood Shores, CA (US)

(72) Inventors: Aleksei Vasilievich Mokeev, Karlsruhe (DE); Kaj van de Loo, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 223 days.

(21) Appl. No.: 15/335,239

(22) Filed: Oct. 26, 2016

(65) Prior Publication Data
US 2017/0279928 A1   Sep. 28, 2017

Related U.S. Application Data

(60) Provisional application No. 62/314,149, filed on Mar. 28, 2016.

(51) Int. Cl.
*H04L 29/06* (2006.01)
*G06F 16/11* (2019.01)
(Continued)

(52) U.S. Cl.
CPC .............. *H04L 67/42* (2013.01); *G06F 8/60* (2013.01); *G06F 9/5072* (2013.01); *G06F 9/541* (2013.01); *G06F 16/113* (2019.01)

(58) Field of Classification Search
CPC ...................................................... H04L 67/42
See application file for complete search history.

(56) References Cited

U.S. PATENT DOCUMENTS 6,536,037 B1 *   3/2003   Guheen ............... G06F 8/71
                                                   703/2
6,615,166 B1 *   9/2003   Guheen ............... G06Q 10/06
                                                   703/27
(Continued)

FOREIGN PATENT DOCUMENTS

CA          1271827        7/1990
CN         105900396       8/2016
(Continued)

OTHER PUBLICATIONS

Demarest et al., "Oracle Cloud COmputing", May 2010, An Oracle White Paper, Oracle Corporation, 22 pages.*
(Continued)

*Primary Examiner* — Jimmy H Tran
(74) *Attorney, Agent, or Firm* — Kilpatrick Townsend & Stockton, LLP

(57) ABSTRACT

Methods, systems, and computer readable mediums are disclosed for introducing pre-formed instruction sets to a mobile cloud service. In some examples, an archive file, such as a .zip file, can include two sets of files: 1) logic for creating an application programming interface (API) and connecting the API with backend service behind a corporate enterprise network's firewall, and 2) custom user-code. In such examples, the API can connect through defined channels to the back end service. In some examples, the custom user code can execute in a secure virtual machine (VM) on the cloud service. In such examples, the custom user code can perform error checks on data, recalculate or reformat data, or otherwise modify it before sending to a user's mobile device or receiving from a user's device.

18 Claims, 9 Drawing Sheets

(51) Int. Cl.
*G06F 9/54* (2006.01)
*G06F 8/60* (2018.01)
*G06F 9/50* (2006.01)

(56) References Cited

U.S. PATENT DOCUMENTS

| | | | |
|---|---|---|---|
| 6,721,713 B1* | 4/2004 | Guheen | G06Q 50/01 |
| | | | 705/1.1 |
| 6,751,671 B1 | 6/2004 | Urien | |
| 6,970,935 B1 | 11/2005 | Maes | |
| 7,117,366 B2 | 10/2006 | Vincent | |
| 7,216,142 B2* | 5/2007 | Whipple | G06F 9/465 |
| | | | 707/999.009 |
| 7,315,826 B1* | 1/2008 | Guheen | G06Q 10/06 |
| | | | 705/7.29 |
| 7,430,290 B2 | 9/2008 | Zhu | |
| 7,894,253 B2 | 2/2011 | Kund et al. | |
| 7,984,334 B2 | 7/2011 | Champlin et al. | |
| 8,000,377 B2 | 8/2011 | Blanchard | |
| 8,397,222 B2* | 3/2013 | Warren | G06F 8/41 |
| | | | 717/136 |
| 8,504,837 B2 | 8/2013 | Jasper et al. | |
| 8,589,541 B2* | 11/2013 | Raleigh | H04L 41/0893 |
| | | | 709/224 |
| 8,627,442 B2* | 1/2014 | Ji | H04L 63/0245 |
| | | | 726/11 |
| 8,931,038 B2 | 1/2015 | Pulier et al. | |
| 8,959,063 B2 | 2/2015 | Haeberle et al. | |
| 8,966,004 B2 | 2/2015 | Connelly et al. | |
| 9,038,015 B1 | 5/2015 | Allsbrook | |
| 9,043,600 B2 | 5/2015 | Jasper et al. | |
| 9,053,167 B1* | 6/2015 | Swift | G06F 16/27 |
| 9,081,729 B2 | 7/2015 | Adam et al. | |
| 9,098,346 B2 | 8/2015 | Robb et al. | |
| 9,128,472 B2 | 9/2015 | Lawson et al. | |
| 9,130,901 B2* | 9/2015 | Lee | H04L 63/0218 |
| 9,201,639 B2* | 12/2015 | Kumar | G06F 8/61 |
| 9,225,694 B1* | 12/2015 | Reitzen | H04L 63/0464 |
| 9,231,946 B2 | 1/2016 | Loo | |
| 9,274,919 B2 | 3/2016 | Greifeneder et al. | |
| 9,589,129 B2* | 3/2017 | Richardson | G06F 21/50 |
| 9,632,878 B1* | 4/2017 | Maccanti | G06F 11/1469 |
| 9,633,051 B1* | 4/2017 | Maccanti | G06F 11/1451 |
| 9,813,509 B1* | 11/2017 | Visser | H04L 67/16 |
| 9,940,454 B2* | 4/2018 | Richardson | G06F 21/50 |
| 9,992,166 B2* | 6/2018 | Ji | H04L 63/0245 |
| 2002/0032612 A1* | 3/2002 | Williams | G06Q 10/08 |
| | | | 705/26.1 |
| 2003/0187631 A1 | 10/2003 | Masushige et al. | |
| 2004/0107196 A1 | 6/2004 | Chen et al. | |
| 2004/0162823 A1 | 8/2004 | Van de Loo et al. | |
| 2005/0259723 A1 | 11/2005 | Blanchard | |
| 2006/0070066 A1* | 3/2006 | Grobman | H04L 63/12 |
| | | | 718/1 |
| 2006/0112127 A1 | 5/2006 | Krause et al. | |
| 2006/0206348 A1 | 9/2006 | Chen et al. | |
| 2007/0180450 A1 | 8/2007 | Croft et al. | |
| 2007/0192329 A1 | 8/2007 | Croft et al. | |
| 2008/0010676 A1 | 1/2008 | Dosa Racz et al. | |
| 2008/0027755 A1 | 1/2008 | Portnoy et al. | |
| 2008/0201455 A1 | 8/2008 | Husain | |
| 2009/0158302 A1 | 6/2009 | Nicodemus et al. | |
| 2009/0170557 A1 | 7/2009 | Chauhan et al. | |
| 2010/0064179 A1 | 3/2010 | Champlin et al. | |
| 2010/0257507 A1* | 10/2010 | Warren | G06F 8/40 |
| | | | 717/106 |
| 2010/0290347 A1 | 11/2010 | Jiang et al. | |
| 2011/0093567 A1 | 4/2011 | Jeon et al. | |
| 2011/0307547 A1 | 12/2011 | Backer et al. | |
| 2012/0072985 A1* | 3/2012 | Davne | H04L 63/0272 |
| | | | 726/22 |
| 2012/0109902 A1 | 5/2012 | Rozensztejn et al. | |
| 2012/0155470 A1 | 6/2012 | McNamee et al. | |
| 2012/0158872 A1 | 6/2012 | McNamee et al. | |
| 2012/0158993 A1 | 6/2012 | McNamee et al. | |
| 2012/0158994 A1 | 6/2012 | McNamee et al. | |
| 2012/0158995 A1 | 6/2012 | McNamee et al. | |
| 2012/0176968 A1 | 7/2012 | Luna | |
| 2012/0179825 A1 | 7/2012 | Dhoolia et al. | |
| 2012/0304275 A1* | 11/2012 | Ji | H04L 63/0245 |
| | | | 726/11 |
| 2013/0055256 A1 | 2/2013 | Banga et al. | |
| 2013/0086210 A1 | 4/2013 | Yiu et al. | |
| 2013/0086211 A1 | 4/2013 | Sondhi et al. | |
| 2013/0091502 A1 | 4/2013 | Kang et al. | |
| 2013/0110778 A1 | 5/2013 | Taylor et al. | |
| 2013/0174154 A1 | 7/2013 | Poore et al. | |
| 2013/0205279 A1* | 8/2013 | Osminer | G06F 9/44589 |
| | | | 717/123 |
| 2013/0205283 A1* | 8/2013 | Warren | G06F 8/40 |
| | | | 717/141 |
| 2013/0219176 A1 | 8/2013 | Akella et al. | |
| 2013/0227636 A1 | 8/2013 | Bettini et al. | |
| 2013/0275492 A1 | 10/2013 | Kaufman et al. | |
| 2013/0297662 A1 | 11/2013 | Sharma et al. | |
| 2014/0025832 A1 | 1/2014 | Ito | |
| 2014/0040977 A1 | 2/2014 | Barton et al. | |
| 2014/0075431 A1* | 3/2014 | Kumar | G06F 9/5072 |
| | | | 717/175 |
| 2014/0081925 A1 | 3/2014 | Haeberle et al. | |
| 2014/0108665 A1 | 4/2014 | Arora et al. | |
| 2014/0181864 A1 | 6/2014 | Marshall et al. | |
| 2014/0245423 A1* | 8/2014 | Lee | H04L 63/0218 |
| | | | 726/12 |
| 2014/0282936 A1* | 9/2014 | Fitzgerald | H04L 63/10 |
| | | | 726/6 |
| 2014/0295821 A1 | 10/2014 | Qureshi | |
| 2014/0366000 A1 | 12/2014 | Batabyal et al. | |
| 2015/0074678 A1 | 3/2015 | Vachnis et al. | |
| 2015/0082385 A1 | 3/2015 | Maria | |
| 2015/0130365 A1 | 5/2015 | Kim et al. | |
| 2015/0227405 A1 | 8/2015 | Jan et al. | |
| 2015/0227406 A1 | 8/2015 | Jan et al. | |
| 2015/0229638 A1 | 8/2015 | Loo | |
| 2015/0229645 A1 | 8/2015 | Keith et al. | |
| 2015/0256603 A1 | 9/2015 | Pillai et al. | |
| 2015/0278245 A1 | 10/2015 | Sagar et al. | |
| 2015/0341318 A1* | 11/2015 | Lee | H04L 63/0218 |
| | | | 726/11 |
| 2015/0347542 A1* | 12/2015 | Sullivan | G06F 16/254 |
| | | | 707/602 |
| 2016/0028688 A1 | 1/2016 | Chizhov et al. | |
| 2016/0072789 A1 | 3/2016 | Loo | |
| 2016/0205180 A1 | 7/2016 | Jan et al. | |
| 2016/0321452 A1* | 11/2016 | Richardson | G06F 21/50 |
| 2017/0147810 A1* | 5/2017 | Richardson | G06F 21/50 |
| 2018/0152448 A1* | 5/2018 | Fitzgerald | H04L 63/10 |
| 2018/0189478 A1* | 7/2018 | Richardson | G06F 21/51 |

FOREIGN PATENT DOCUMENTS

| | | |
|---|---|---|
| CN | 105900397 | 8/2016 |
| CN | 105917627 | 8/2016 |
| EP | 1569112 | 8/2005 |
| EP | 2849061 | 3/2015 |
| WO | 2013071087 | 5/2013 |
| WO | 2013086211 | 6/2013 |
| WO | 2013126570 | 8/2013 |
| WO | 2015038225 | 3/2015 |
| WO | 2015042547 | 3/2015 |
| WO | 2015050568 | 4/2015 |
| WO | 2015119529 | 8/2015 |
| WO | 2015119658 | 8/2015 |
| WO | 2015119659 | 8/2015 |
| WO | 2015152956 | 10/2015 |

OTHER PUBLICATIONS

Chun, Byung-Gon, and Petros Maniatis. "Dynamically partitioning applications between weak devices and clouds." Proceedings of the 1st ACM Workshop on Mobile Cloud Computing & Services: Social Networks and Beyond. ACM, 2010.*

(56) References Cited

OTHER PUBLICATIONS

Giurgiu, Ioana, et al. "Calling the cloud: enabling mobile phones as interfaces to cloud applications." Proceedings of the 10th ACM/IFIP/USENIX International Conference on Middleware. Springer-Verlag New York, Inc., 2009.*
Yi, Shanhe, Cheng Li, and Qun Li. "A survey of fog computing: concepts, applications and issues." Proceedings of the 2015 workshop on mobile big data. ACM, 2015.*
Kovachev, Dejan, Yiwei Cao, and Ralf Klamma. "Mobile cloud computing: A comparison of application models." arXiv preprint arXiv:1107.4940 (2011).*
App Cloud—Salesforce, http://www.salesforce.com/in/platform/services/how-you-integrate/, © Copyright 2000-2016, 4 pages.
Booking and Paying for Your Holiday—Holidays FAQs, et2holidays.com, Copyright Jet2holidays.com, 2002-2014, a subsidiary of Dart Group PLC, Retrieved from the Internet: <URL: http://www.jet2holidays.com/faqs-essential-info2.aspx>, 2002-2014, 2 pages.
Disney FastPass+, AllEars.Net, R.Y.I. Copyright Enterprises, LLC, Retrieved from the Internet: <URL: http://allears.net/tp/ fastpass-plus.htm>, 1999-2014, 4 pages.
Dispersed Virtual Queue Management, tensabarrieronline.com, Tensabarrieronline—Tamis Corporation, Retrieved from the Internet: <URL: http: //www.tensabarrieronline.com/shop/dispersed-virtual-queue-management!>, Copyright 2014, 2 pages.
Electronic Queuing—QtracVR Virtual Queuing System, lavi.com, Lavi Industries, Retrieved from the Internet: <URL: http://www.lavi.com/electronic-queuing/virtual-queuing.aspx>, Copyright 2014, 2 pages.
Electronic Ticket System—Queue Management without Lines, queuesolutions.com, Copyright 2013 Queue Solutions, Inc., Retrieved from the Internet: <URL: http://queuesolutions.com/electronic-ticketsystem.php>, 2012, 2 pages.
EQTM Virtual Queuing, tensator.com, Copyright Tensator, Retrieved from the Internet: <URL: http://www.tensator.com/us/showroom/eq-virtual-queuing.aspx>, 1 page.
NEMO-Q Virtual Queuing, NEMO-Q.com, retrieved from the Internet: <URL: http://www.nemoq.com/virtual_queuing_systems.html>, Copyright 2014, 3 pages.
PaaS Heterogeneity, https://sites.google.com/a/fci-cu.edu.eg/paas-heterogeneity/, 5 pages.
Queuing at busy check-in counters is now a thing of the past, thanks to our online "self check-in" system, airnamibia.com, Air Namibia, Retrieved from the Internet: <URL: http://www.airnamibia.com/planbook/check-in-online/>, 2 pages.
Using the CA API Gateway for Cloud Integration, http://www.ca.com/in/~/media/Files/DataSheets/ca-api-gateway-for-cloud-integration.PDF, © 2014, 2 pages.
VirtuaQ: Virtual Queue Management System, esco.com.sg, Copyright 2012, Esco Pte. Ltd., <URL: http://www.esco.com.sg/development-and-mobility/virtuaq/>, 2012, 3 pages.
Web Check-in—Bangkok Airways, bangkokair.com, Bangkok Airways, Retrieved from the Internet: <URL: http://www.bangkokair.com/pages/view/web-check-in>, 2 pages.
Bach, The Design of the Unix Operating System, Ch. 7, Bell Tele. Labs. Inc., 1986, 56 pages.
Chanliau, Oracle Enterprise Gateway:Securing SOA and Web Services with Oracle Enterprise Gateway, retrieved from the Internet: URL:http://www.oracle.comjtechnetwork/middleware/id-mgmtjoeg-tech-wp-apr-2011-345875.pdf, Apr. 30, 2011, 22 pages.
Facemire et al., Cloud Mobile Development: Enabled by Back-End-As-A-Service, Mobile's New Middleware, Aug. 30, 2012, 15 pages.
Keating, Cloud-based setup reduces wait-times at government offices (with related video), American City & County, Retrieved from the Internet: <URL: http://americancityandcounty.com/telecommunications/cloud-based-setup-reduces-wait-timesgovernment-offices-related-video>, May 5, 2014, 4 pages.
Lawson, House of Fraser trials virtual queue system for online collection, Retail Week [online]. EMAP Publishing Limited, Retrieved from the Internet: <URL: http://www.retailweek.com/companies/house-of-fraser/house-of-fraser-trials-virtual-queue-systemfor-online-collection/5052769.article>, Sep. 6, 2013, 3 pages.
Ponge, Fork and Join: Java can excel at painless parallel programming too!, Oracle Technology Network (retrieved on Sep. 15, 2014], retrieved from the internet: <URL: http://www.oracle.com/technetwork/articles/java/fork-join-422606.html>, Jul. 2011, 7 pages.
Ponge, Scenarios for using Oracle Nashorn as a command-line tool and as an embedded interpreter in Java applications, Oracle Technology Network [online], (retrieved on Sep. 15, 2014], retrieved from the internet: <URL: http://www.oracle.com/technetwork/articles/java/jf14-nashorn-2126515.html>, 8 pages.
Tang et al., Enterprise Mobile Service Architecture: Challenges and Approaches, Service Technology Magazine, No. LXXIX, Dec. 2013, pp. 1-43.
Woods, Oracle Unveils Project Avatar at JavaOne, InfoQ.com, Sep. 27, 2013, [online], [retrieved on Sep. 15, 2014], retrieved from the internet :<URL: http://www.infoq.com/news/2013/09/oracle-unveils-avatar>, Sep. 27, 2013, 9 pages.
International Application No. PCT/RU2014/000677, International Preliminary Report on Patentability dated Aug. 18, 2016, 10 pages.
International Application No. PCT/RU2014/000677, International Search Report and Written Opinion dated Feb. 19, 2015, 13 pages.
International Application No. PCT/US2014/044165, International Preliminary Report on Patentability dated Mar. 14, 2016, 25 pages.
International Application No. PCT/US2014/044165, International Search Report and Written Opinion dated Nov. 11, 2014, 9 pages.
International Application No. PCT/US2014/053747, International Preliminary Report on Patentability dated Aug. 18, 2016, 14 pages.
International Application No. PCT/US2014/053747, International Search Report and Written Opinion dated Nov. 25, 2014, 17 pages.
International Application No. PCT/US2014/056154, International Preliminary Report on Patentability dated May 6, 2016, 13 pages.
International Application No. PCT/US2014/056154, International Search Report and Written Opinion dated Dec. 5, 2014, 12 pages.
International Application No. PCT/US2014/056154, Written Opinion dated Jan. 4, 2016, 11 pages.
U.S. Appl. No. 14/314,729, Final Office Action dated Oct. 6, 2016, 37 pages.
U.S. Appl. No. 14/314,729, Non-Final Office Action dated May 13, 2016, 47 pages.
U.S. Appl. No. 14/475,285, Corrected Notice of Allowability dated Nov. 25, 2015, 2 pages.
U.S. Appl. No. 14/475,285, Notice of Allowance dated Aug. 24, 2015, 17 pages.
U.S. Appl. No. 14/489,172, Final Office Action dated Oct. 13, 2016, 90 pages.
U.S. Appl. No. 14/489,172, Non-Final Office Action dated Apr. 28, 2016, 54 pages.
U.S. Appl. No. 14/490,619, Non-Final Office Action dated Mar. 29, 2016, 5 pages.
U.S. Appl. No. 14/490,619, Notice of Allowance dated Aug. 18, 2016, 5 pages.
U.S. Appl. No. 14/490,621, Non-Final Office Action dated Apr. 14, 2016, 5 pages.
U.S. Appl. No. 14/490,621, Notice of Allowance dated Sep. 20, 2016, 5 pages.
PCT/US2016/058912 received an International Report on Patentability dated May 14, 2018, 11 pages.
PCT/US2016/058912 received a Written Opinion dated Jan. 15, 2018, 10 pages.
International Application No. PCT/US2016/058912, International Search Report and Written Opinion dated Mar. 21, 2017, 17 pages.
International Application No. PCT/US2016/058912, Invitation to Pay Add'l Fees and Partial Search Report dated Jan. 25, 2017, 5 pages.

* cited by examiner

PRE-FORMED INSTRUCTIONS FOR A MOBILE CLOUD SERVICE

CROSS-REFERENCES TO RELATED APPLICATIONS

This application claims the benefit of and priority to U.S. Provisional Patent Application No. 62/314,149 filed Mar. 28, 2016 and entitled "Mobile Cloud Service (MCS) Templates," the entire disclosure of which is hereby incorporated by reference for all purposes.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Mobile applications generally operate by communicating with a server to determine content to display on a mobile phone. Both the mobile phone and the server can include a portion of the mobile application. The portion on the server (sometimes referred to as server-side application) can respond to requests from the portion on the mobile phone (sometimes referred to as client-side application). In some examples, the requests can use hypertext transfer protocol (HTTP). The server-side application can typically store persistent data and cannot be seen by a user of the mobile phone. The client-side application can be included on the mobile phone and respond to one or more inputs, including a user input. The client-side application can use hypertext markup language (HTML), cascading style sheets (CSS), or JavaScript.

In some examples, the server-side application can include a programming interface (e.g., application programming interface) that allows the client-side application to communicate with the server-side application. The server-side application can further include at least one or more of software code associated with responding to communications from the client-side application and one or more connectors to connect the server-side application to one or more backend systems (e.g., a database). The one or more connectors can also format and shape data for viewing on the mobile phone by the client-side application when the data is received from the backend system).

BRIEF SUMMARY

The present disclosure relates generally to systems, methods, and computer readable mediums for providing a server-side portion of a mobile application. In particular, processes for importing and exporting a server-side application that can easily connect with the mobile application are provided. The server-side application can include at least one or more of custom code associated with a mobile application and a programming interface for interacting between the server-side application and the client-side application. The server-side application can further include one or more connectors to interface between the server-side application and a backend system.

Provided are devices, computer-program products, and methods for introducing a pre-formed instruction set to a mobile cloud service. For example, a method can include extracting a first set of files and a second set of files. In some examples, the first and second set of files can be extracted from an archive file package. In some examples, the first set of files can include logic for creating an application programming interface (API). In such examples, the first set of files can also include logic for connecting the API with a backend service. In some examples, the second set of files can include software code. In some examples, the archive file package can received from a remote device.

The method can further include creating an API using the logic in the first set of files and connecting the API with a backend service in a cloud service. In some examples, the API can be connected using the logic for connecting the API with a backend service. The method can further include executing the software code of the second set of files in a user space of the cloud service.

In some implementations, the method can further include receiving a request from a mobile device. In some examples, the request can be received through a firewall. In such examples, the request can query for information or data from a server-side application. In such examples, the method can further include dispatching the request to the software code using the API according to logic in a first virtual machine. In such examples, the API can connect with the backend service outside of the firewall. In some examples, the method can further include generating a response to the request using the software code. In such examples, the software code can be executing in a user sandbox area of a second virtual machine. The method can further include routing the response from the backend service to the mobile device.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

DETAILED DESCRIPTION

Figure 1:
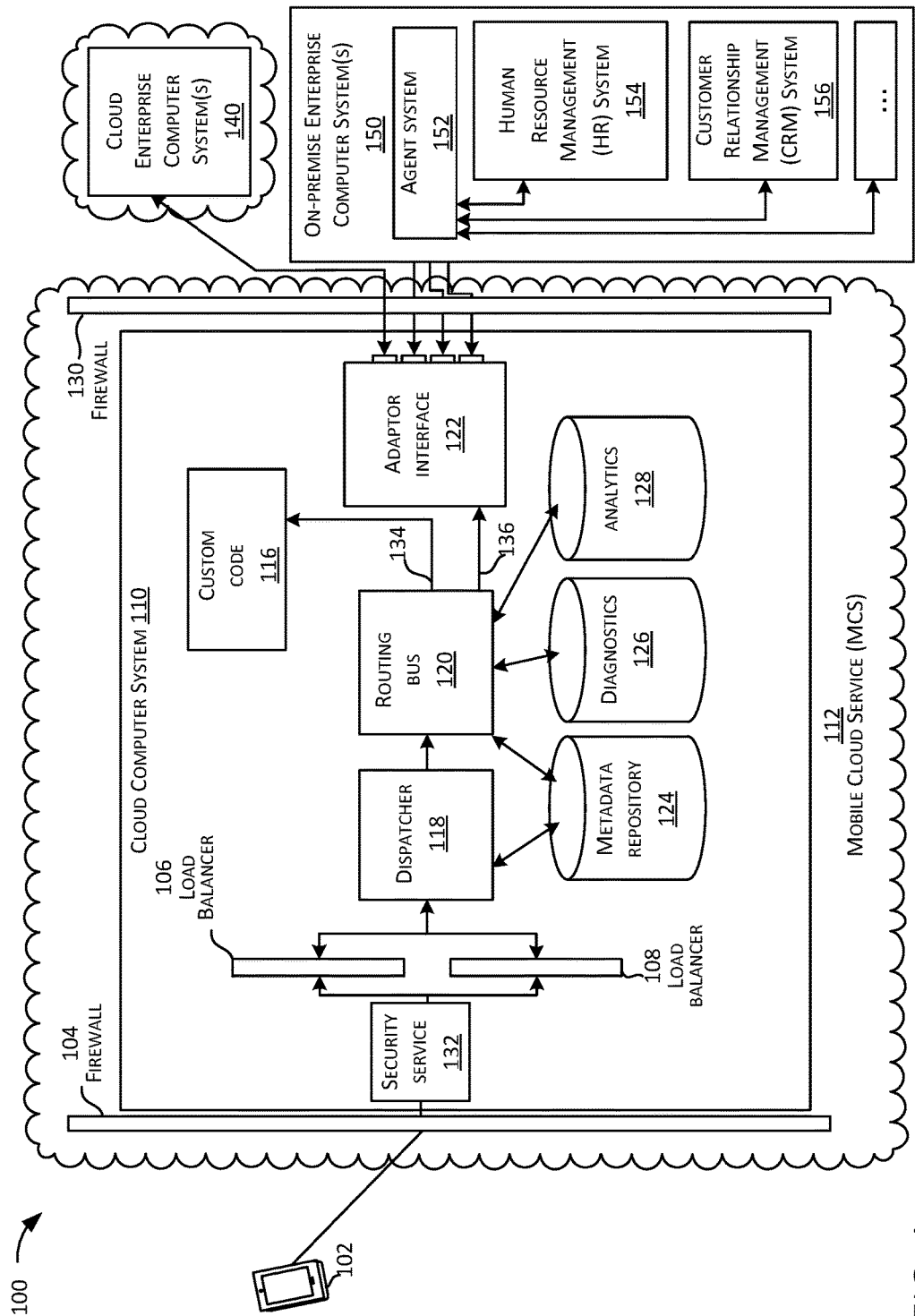
FIG. 1 illustrates an example of a block diagram of a computing environment.

In the following description, for the purposes of explanation, specific details are set forth in order to provide a thorough understanding of examples of this disclosure. However, it will be apparent that various examples may be practiced without these specific details. The figures and description are not intended to be restrictive.

The ensuing description provides examples only, and is not intended to limit the scope, applicability, or configuration of this disclosure. Rather, the ensuing description of the examples will provide those skilled in the art with an enabling description. It should be understood that various changes may be made in the function and arrangement of elements without departing from the spirit and scope of the description as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The present disclosure relates generally to systems, methods, and computer readable mediums for providing a server-side portion of a mobile application. In particular, processes for importing and exporting a server-side application that can easily connect with the mobile application are provided. The server-side application can include at least one or more of custom code associated with a mobile application and a programming interface for interacting between the server-side application and the client-side application. The server-side application can further include one or more connectors to interface between the server-side application and a back-end system.

FIG. 1 illustrates an example of a block diagram of a computing environment 100 for facilitating communication between a mobile computing device 102 and one or more enterprise computer systems, such as a cloud computing system 140 and an on-premise enterprise computer system 150. Such communications may be to exchange or transfer enterprise data, request services provides by an enterprise computer system, communicate messages, or combinations thereof.

An enterprise computer system can include various computing systems that are configured to operate for an entity or an enterprise. For example, an enterprise computer system can include one or more computer systems, such as an enterprise server computer (e.g., a back-end server computer), to handle requests for services. An enterprise computer system may include applications and/or services, which can process and/or operate using enterprise data. For example, enterprise computer system 150 may provide one or more services and/or applications for managing or operating an enterprise. Services may include, without restriction, customer relationship management (CRM), human capital management (HCM), human resource (HR) management, supply chain management, enterprise communication, email communication, business services, other enterprise management services or applications, or combinations thereof. Enterprise computer system 150 may include one or more computer systems dedicated to providing one or more services. In some examples, each different computer system providing a service may be located on-premise of an enterprise or may be located remotely from an enterprise. In some examples, multiple different computer systems supporting different services may be situated in a single geographical location, such as on-premises of an enterprise. In the example shown in FIG. 1, on-premises enterprise computer system 150 may include an HR system 154 and a CRM system 156, both of which may be located on-premises of an enterprise. In some examples, enterprise computer system 140 may include or implement an agent system 152 to facilitate or handle communication between cloud computer system 110 and one or more enterprise systems 154, 156. Enterprise computer systems, such as cloud enterprise computer system 140 and on-premise enterprise computer system 150 are described below in further detail.

The computer environment 100 may include a mobile cloud service ("MCS") 112 implemented to operate as a secure intermediary computing environment that may facilitate communication between the computing device 102 and one or more enterprise computer systems because computing device 102 may not be configured to communicate with such enterprise computer systems. For example, some enterprise computer systems may be supported by legacy or back-end computer systems. Such systems may be configured to operate using different communication and/or security protocols. The protocols supported by such enterprise computer systems may be different from those supported by mobile computing devices. MCS 112 may support communication with different types of mobile computing devices. As such, MCS 112 may implement techniques to facilitate communication between enterprise computer systems and mobile computing devices to enable them to communicate with each other despite their incompatibilities in communication, such as differences between formats or communication protocols. For example, MCS 112 may translate communication protocols between mobile computing devices and enterprise computer systems.

Cloud computer system 110 may support MCS 112. Cloud computer system 110 may be implemented using hardware, software, firmware, or combinations thereof. For example, cloud computer system 110 may include one or more computing devices, such as a server computer. Cloud computer system 110 may include one or more memory storage devices and one or more processors. A memory storage device can be accessible to the processor(s) and can include instructions stored thereon which, when executed by the processor(s), cause the processor(s) to implement one or more operations disclosed herein. In some examples, the memory storage devices may operate as local storage (e.g., cache). Cloud computer system 110 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer-readable storage medium. In some examples, local storage may include or implement one or more databases (e.g., a document database, a relational database, or other type of database), one or more file stores, one or more file systems, or combinations thereof. The local storage may store enterprise data.

In certain examples, cloud computer system 110 may include one or more data stores, such as a metadata repository 124, diagnostics store 126, and an analytics store 128. The data stores 124, 126, 128 may be accessible by any component in cloud computer system 110.

Metadata repository 124 may store all the metadata associated with MCS 112. This information may be composed of both run-time and design-time data, each having their own requirements on availability and performance. A tenant or subscriber of MCS 112 may have any number of applications (sometimes referred to herein as a server-side application). Each application may be versioned and may have an associated zero or more versioned resource APIs and zero or more versioned services implementations those resource application programming interface (API) contracts. These entities are what the run-time uses to map virtual requests (mAPIs) to the concrete service implementation (service). This mapping provides a mobile developer with the luxury of not having to know the actual implementation service when she designs and builds her application. As well as not requiring her to have to republish a new application on every service bug fix. Metadata repository 124 may store one or more callable interfaces, which may be invoked by a computing device (e.g., computing device 102). The callable interfaces may be customizable by a user (e.g., a developer) of an application to facilitate communication with MCS 112. Metadata repository 124 may store metadata corresponding to one or more configurations of a callable interface. Metadata repository 124 may be configured to store metadata for implementing a callable interface. The callable interface may be implemented to translate between a one format, protocol, or architectural style for communication and another format, protocol, or architectural style for communication. Metadata repository 124 may be modifiable by an authenticated user via the external network.

A server-side application can be used to remotely perform operations associated with a mobile application. For example, the server-side application can respond to requests for data by the mobile application, store information associated with the mobile application, and send content to the mobile application. In some examples, the server-side application can serve the mobile application.

In some examples, the MCS 112 can further include a backend system. The backend system can assist the server-side application in performing operations. For example, the backend system can be where information is stored, computations are performed, or any other actions are performed to supplement the server-side application. In other examples, the backend system can be remote from the MCS 112. In such examples, the server-side application can communicate with the backend system using a network (e.g., the Internet).

Diagnostics store 126 may store diagnostics information about processing occurring in MCS 112. Diagnostics store 126 may store messages communicated via MCS 112 and log information. Analytics store 128 may store logging and analytics data captured during processing in the system.

On behalf of MCS 112, cloud computer system 110 may utilize its computing resources to enable execution of custom code 116 (e.g., operations, applications, methods, functions, routines, or the like). In some examples, the custom code can be executed in a user sandbox area. A user sandbox area can be an environment that isolates code executed in the user sandbox area. In some examples, a user sandbox can be an environment that parametrizes and encapsulated code execution within itself. Computing resources may be allocated for use with respect to a particular user associated as a subscriber or tenant to MCS 112. Resources may be allocated with respect to a user, a device, an application, or other criterion related to a subscriber. MCS 112 may be scaled in or out, depending on the demand of mobile computing devices seeking to communicate with enterprise computer systems. MCS 112 can be configured such that it is elastic to handle surges and temporary periods of higher than normal traffic between mobile computing devices and enterprise computer systems. In some examples, MCS 112 may include elements that support scalability such that components may be added or replaced to satisfy demand in communication.

Computing device 102 may communicate (e.g., send a request message) with MCS 112 to request service provided by an enterprise computer system. Computing device 102 (e.g., a mobile computing device) may be implemented using hardware, firmware, software, or combinations thereof. Computing device 102 may communicate with enterprise computer systems 140, 150 via MCS 112. Computing device 102 may include or may be implemented as an endpoint device, a personal digital assistant (PDA), a tablet computer, a laptop computer, a mobile computing device, a desktop computer, a wearable computer, a pager, etc. Computing device 102 may include one or more memory storage devices and one or more processors. Computing device 102 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer-readable storage medium. In some examples, local storage may include or implement one or more databases (e.g., a document database, a relational database, or other type of database), one or more file stores, one or more file systems, or combinations thereof. The local storage may store enterprise data.

In various examples, computing device 102 may be configured to execute and operate one or more applications such as a web browser, a client application, a proprietary client application, or the like (e.g., a server-side application). The applications can include specific applications configured for enterprise data and/or services provided by an enterprise computer system. Client applications may be accessible or operated via one or more network(s). Applications may include a graphical user interface (GUI) for operating the application.

Computing device 102 may communicate with MCS 112 via one or more communication networks using wireless communication. Examples of communication networks may include a mobile network, a wireless network, a cellular network, a local area network (LAN), a wide area network (WAN), other wireless communication networks, or combinations thereof. In certain examples, computing device 102 may establish a communication connection 114 with MCS 112 using a custom communication protocol (e.g., a custom protocol). Connection 114 may be established with MCS 112 through cloud computer system 110. The custom protocol may be an HTTP-based protocol. By utilizing a custom communication protocol, computing device 102 may operate on any computing device platform to communicate with cloud computer system 110.

Computing device 102 may communicate with cloud computer system 110 through one or more callable interfaces, e.g., application programming interfaces (APIs). A callable interface may be implemented on computing device 102. The callable interface may be implemented for custom applications that enable those applications to communicate with MCS 112. In some examples, a callable interface may be developed for MCS 112. The callable interface may enable applications to communicate with MCS 112 without having to adapt to differences in protocols (e.g., communication or development protocols) and/or architectural styles or formats.

MCS 112 may be protected by one or more firewalls 104, 130 to provide a secure environment to process requests and execute custom code 116. Communication between computing device 102 and MCS 112 may be separated by an external communication firewall 104. Firewall 104 may be connected with cloud computer system 110 to facilitate secure access to MCS 112. Firewall 104 may permit communication of messages between cloud computer system 110 and computing devices (e.g., computing device 102). Such messages (e.g., HTTP messages or REST messages) may conform to a communication protocol (e.g., HTTP or REST), which may be supported by a callable interface. In another example, a message between cloud computer system 110 and computing device 102 may conform to a communication protocol such as Speedy (SPDY). MCS 112 may manage firewall 130 to secure communication between cloud computer system 110 and enterprise computer systems 140, 150. Firewall 130 may permit communication of messages between cloud computer system 110 and computing devices (e.g., computing device 102). Such messages (e.g., SPDY messages, HTTP messages or REST messages) may conform to a communication protocol (e.g., SPDY, HTTP, or REST). Communication between computing device 102 and enterprise computer systems 140, 150 may be two-way via MCS 112.

Because communication with computing device 102 and enterprise computer systems 140, 150 may occur via an unsecure, public network, firewalls 104, 130 provide an added layer of protection for communications to and from MCS 112. Firewalls 104, 130 may enable MCS 112 to distinguish its internal network from an external network connecting computing device 102 and enterprise computer systems 140, 150. In some examples, firewalls 104, 130, although shown as two distinct firewalls, may be implemented as a single firewall that encapsulates MCS 112.

Cloud computer system 110 may further operate as an intermediary computing environment by communicating with enterprise computer systems, some of which may have different communication protocols. Such communication protocols may be custom or specific to an application or service in communication with cloud computer system 110. Further, cloud computer system 110 may communicate with an enterprise computer system to provide enterprise services and/or to exchange enterprise data according to a format supported by the enterprise computer system. Cloud computer system 110 may maintain local storage (e.g., local cache) of enterprise data and may use the local storage to manage synchronization of the enterprise data between mobile computing devices and enterprise computer systems 140, 150.

Computing device 102 may communicate (e.g., send a request message) with MCS 112 to request service provided by an enterprise computer system. Requests that are received through firewall 104 may be processed first by security service 132. Security service 132 may manage security authentication for a user associated with a request. Thus, a cloud computer system may provide technical advantages that include providing security mechanisms described herein which may protect the integrity of customer communications and enterprise data. Technical advantages of cloud computer system may include preventing or reducing compromised communications and/or data from being compromised, authentication may occur initially, restricting access to only those who have the required credentials. Technical advantages of cloud computer system may include the services and service invocation flow being structured such that as requests come in they may only be able to access services for which they are authorized. By decoupling authorization from the rest of the system, processing may include the task of authorizing "what can be done by whom" being delegated to a dedicated provisioned security subsystem (e.g., an identity management system) that may be expanded to support whatever additional custom security measures are required by a specific corporate customer. In some examples, security authentication may be determined for a request, a session, a user, a device, other criterion related to the user, or combinations thereof. Security authentication may be performed for each request that is received. In some examples, security service 132 may determine authentication based on a previous verification of a request. Security authentication may be determined for a user or a device such that requests to different enterprise computer systems 140, 150 may be authenticated based on a single verification of security.

In some examples, security service 132 may determine a security protocol for a requested enterprise computer system and accordingly generate a security token according to such security protocol. The security token may be passed along with a request to an enterprise computer system to enable that enterprise computer system to verify authentication based on the generated security token. Enterprise computer systems may support different security protocols. A security protocol may be a standard by which security is determined. Security may be verified based on a security token that is generated by security service 132. Security service 132 may determine a security protocol for an enterprise computer system identified for a request. In some examples, an enterprise computer system 150 may have an agent system 152, which may be configured or implemented according to a custom or specific security protocol supported by MCS 112. As such, MCS 112 may generate a security token according to such custom security protocol.

Cloud computer system 110 may include, implement, and/or communicate with one or more load balancer systems 106, 108. Upon determining security authentication, cloud computer system 110 may request any one of load balancer systems 106, 108 to examine a request that it receives and to detect which service the request is directed to. MCS 112 may be configured with load balancers 106, 108 and updated with resources that get started up, so that when a request comes in, load balancers 106, 108 can balance a requested load across the different resources.

Cloud computer system 110 may include a dispatcher 118 that may handle requests and dispatch them to the appropriate service. A request may be routed to an appropriate service upon dispatch. In some examples, a service itself may route an internal request to another internal service in MCS 112 or in an enterprise computer system. In some examples, dispatcher 118 may resolve a request to determine its destination based on a location (e.g., an address) of a destination identified in a uniform resource identifier (URI) and/or a uniform resource locator (URL) of the request.

Dispatcher 118 may parse a request and its header to extract one or more of the following information: tenant identifier, service identifier, application name, application version, request resource, operation and parameters, etc. Dispatcher 118 can use the parsed information to perform a lookup in metadata repository 124. Dispatcher 118 may retrieve a corresponding application metadata. Dispatcher 118 may determine the target service based on the requested resource and the mappings in the metadata. While initially a very basic mapping, the metadata can be enhanced to provide for more sophisticated, rules-based dispatching. Dispatcher 118 may perform any dispatcher-specific logging, metrics gathering, etc. Dispatcher 118 may then perform initial authorization according to the application metadata. Dispatcher 118 may format the inbound request and any other necessary information and place the message on routing bus 120 for further processing. Dispatcher 118 may place a request on a queue and await the corresponding response. Dispatcher 118 may process responses received from routing bus 120 and return a response to computing device 102.

In addition to handling the dispatching for external requests, dispatcher 118 may also play a role in dispatching internal requests. Such internal requests can come in the form of composite services or custom code invocations to services. In both cases, the caller could use a logical service name as defined within the application. Dispatcher 118 may use the current execution context to determine the application and use that logical name to determine the appropriate service to invoke.

Cloud computer system 110 may include a routing bus 120 to manage deliver of messages to destinations registered with routing bus 120. Routing bus 120 may operate as a central system for managing communications in cloud service 112. Data communicated through routing bus 120 may be processed to capture and store the data. Routing bus 120 may provide a framework so that additional centralized services (additional authorization, debugging, etc.) can be plugged in easily as necessary. Data captured by routing bus 120 may be stored in diagnostics store 126 and/or analytics store 128.

Routing bus 120 may route messages to one or more destinations. In some examples, a message may include a request to execute custom code 116. In such examples, routing bus 120 may request 134 custom code 116 to be invoked. In some examples, routing bus 120 may pass on a request to a destination enterprise computer system identified by information in a request. Routing bus 120 may request 136 an adaptor interface 122 to perform translations, if necessary, to pass a request to an enterprise computer system, e.g., enterprise computer system 140 or enterprise computer system 150.

In certain examples, cloud computer system 110 may include or implement adaptor interface 122 to translate or convert a message to a protocol supported by a receiving enterprise computer system. Adaptor interface 122 may establish separate communication connections with each of enterprise computer systems 140, 150. Cloud computer system 110 may be configured to communicate with enterprise computer systems 140, 150 via one or more networks (not shown). Examples of communication networks may include the Internet, a mobile network, a public network, a wireless network, a cellular network, a local area network (LAN), a wide area network (WAN), other communication networks, or combinations thereof. In certain examples, communication connections may be high-speed communication connections facilitated using high-speed communication trunks. Communication with an enterprise computer system 140, 150 may pass through firewall 130 which ensures that communication with an external network is secure to prevent unauthorized access to MCS 112 via such communications.

In some examples, cloud computer system 110 may facilitate notifications to a user of computing device 102. Cloud computer system 110 may include an alert management service that supports stateful interaction with a user, for example to deliver an alert based on user preferences through one or more channels, wait for a response, and take action based on the response. Responses to an alert sent on one channel may be received through another channel, which the service needs to be able to handle. The platform may come with built-in state models for popular interaction patterns and be extensible with new state models. Some alert channels may include known communication resources, either one-way or two-way. Examples include SMS, Twitter®, push notifications, and Google Cloud Messaging®.

In some examples, cloud computer system 110 may enable computing device to access and/or request one or more services, such as an object store service, database service, access web services, social services, resource services, or combinations thereof.

Cloud computer system 110 may provide an object store service that may provide a storage facility for BLOBs. The basic unit of storage can be text, with read and write operations. A basic query facility for JSON objects may also be offered.

Cloud computer system 110 may provide a database service to allow for connectivity to hosted databases for performing queries or writes. Required parameterization may require the full connection string for the database, the SQL string or stored procedure to execute, any parameters and possibly credentials. The necessary information can be provided at run time or be pre-configured in the application metadata.

Cloud computer system 110 may provide access to web services such as Simple Access Object Protocol (SOAP) web services. Cloud computer system 110 may provide access to REST services, such as connectivity to arbitrary REST resources.

Cloud computer system 110 may provide access to social services that may provide basic integration with many of the popular social sites such as Facebook®, Twitter®, etc. These services may allow for third party authentication using the user's credentials from those sites as well as access to their services. Examples include sending a tweet or updating your status.

Cloud computer system 110 may provide an public cloud service to enable a user to simplify and optimize communication. For example, a service developer may use the generic web service of MCS 112 to talk to a resource hosted using cloud computer system's 110 cloud service.

In some examples, the computing device 102 can include a mobile application. The mobile application can perform one or more operations using code included with the mobile application. In some examples, an operation of the mobile application can include at least one or more of display content to a user of the computing device 102, receive input from the user, respond to the input from the user, and receive content from a remote system.

Figure 2:
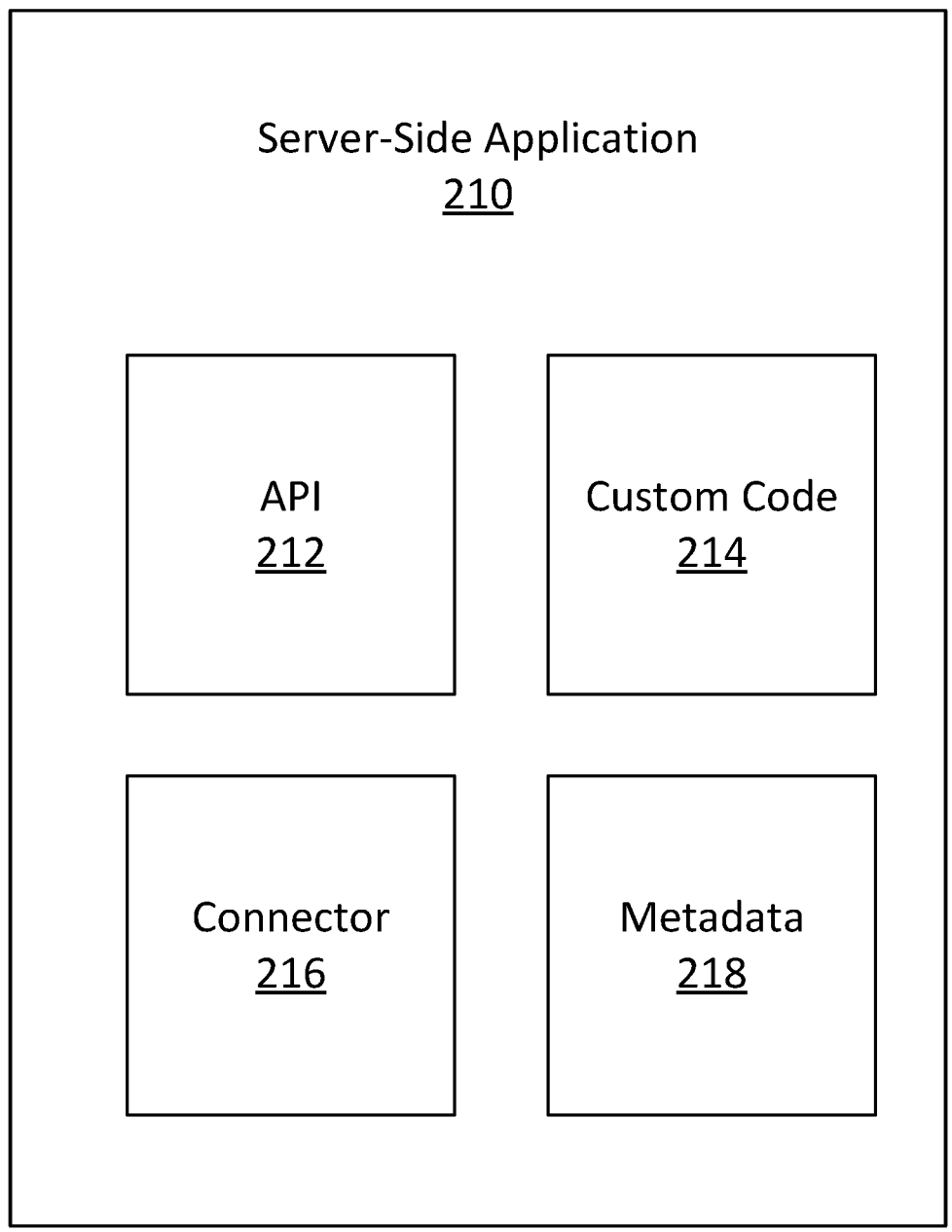
FIG. 2 illustrates an example of a server-side application.

FIG. 2 illustrates an example of a server-side application 210. The server side application can be included in a MCS (e.g., the MCS 112). The server-side application 210 can include at least one or more of a programming interface (e.g., an application programming interface (API) 212), custom code 214, and a connector 216. The API 212 can be used to provide an interface to the server-side application 210 for a mobile application. In some examples, the server-side application can include a plurality of APIs.

The custom code 214 (sometimes referred to as software code or user code) can be one or more instructions, executable by a computer system, to perform operations associated with the server-side application 210. The custom code 214 can be executed (e.g., installed) on a virtual machine. In some examples a virtual machine can be an emulation of a computer system. In such examples, the virtual machine can be running virtual operating systems, or other computing architectures involving virtualization. One or more flexible pools of logical storage devices can be virtualized to maintain virtual storage devices for the virtual machine. Virtual networks can be controlled by a server using software defined networking. In some examples, the custom code 214 can include a first portion of logic associated with a mobile application. In such examples, code on the mobile application can include a second portion of the logic associated with the mobile application; and code on a backend system can include a third portion of the logic associated with the mobile application. A person of ordinary skill in the art will recognize that there can be more or less portions of the logic on more or less systems.

The connector 216 can connect the server-side application 210 with a backend system. In some examples, the connector 216 can provide an interface for the server-side application 210 to the backend system. In some examples, the connector 216 can also format information received from the backend system. In some examples, the server-side application 210 can include a plurality of connectors.

The metadata 218 can include data utilized at design-time or run-time by the server-side application 210 or the mobile cloud service environment. For example, the metadata 218 can include (a) policies, governing the execution of the server-side or mobile application; (b) runtime dependencies between API implementations and connectors; (c) access control information; (d) API to custom code implementation bindings; (e) connector bindings; (f) the like. Examples of policies can include a logging level policy and a production database URI policy. In some examples, a logging level policy can define required log levels in a scope of mobile backend, API, or environment. In some examples, a production database URI policy can point to one or more databases used by a server-side application. In some examples, runtime dependency information can specify that an API implementation consumes (e.g., has a dependency to) one or more connectors. In such examples, the runtime dependency information can be used to guarantee server-side application integrity during deployment, import, and/or export. In some examples, access control information can specify a list of one or more user roles that are allowed to invoke an API. In such examples, the list can be stored in metadata and can be used in design time and/or runtime operations. In some examples, an API binding can describe how an API interacts with custom code (e.g. what portions of the custom code are called by particular APIs). In some examples, a connector binding can describe which particular implementation of a connector is used during connector execution.

In some examples, the API 212 and the custom code 214 can be combined into one entity. In other examples, the connector 216 can also be combined into the one entity such that the three components of the server-side application can be packaged together.

Figure 3:
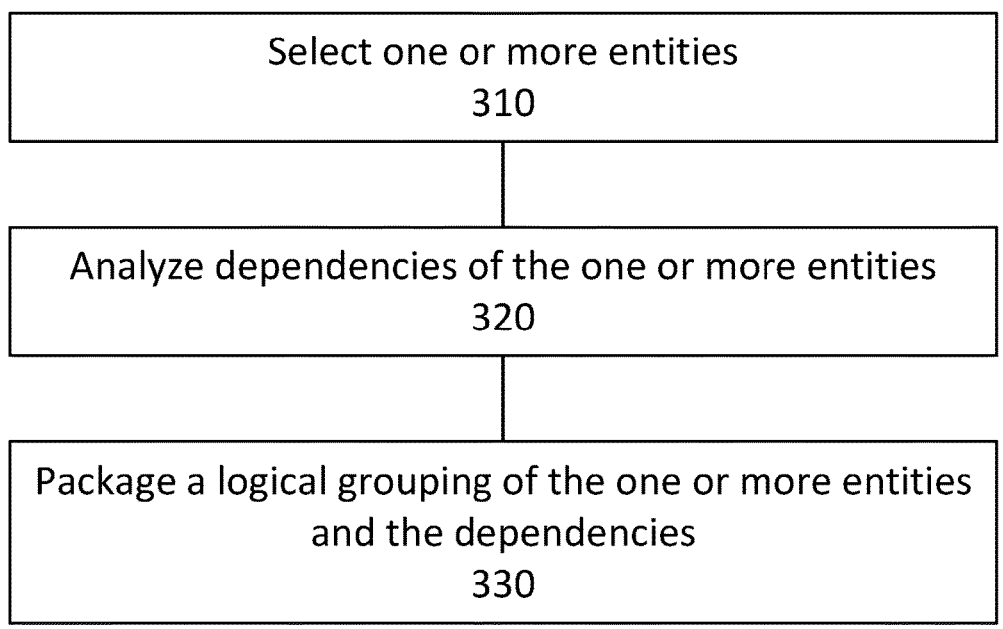
FIG. 3 is a flowchart illustrating an example of a process for creating a package for a server-side application.

FIG. 3 is a flowchart illustrating an example of a process 300 for creating a package for a server-side application. In some aspects, the process 300 can be performed by a mobile cloud service. Process 300 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 310, the process 300 includes selecting one or more entities. The one or more entities can be selected by a user. An entity can be a mobile backend. The mobile backend can be an object that is used to group connectors, APIs, API implementations, and storage collections. The mobile backend can also include security and access credentials for the mobile backend. An entity can also be one or more of an API, an API implementation, a storage collection, or a connector. In some examples, the one or more entities, when combined, can be a server-side application used to perform one or more operations in a mobile cloud service environment.

At step 320, the process 300 includes analyzing dependencies of the one or more entities. For example, an entity can have a dependency on another entity. In addition, items are identified that are required for execution of the selected one or more entities.

At step 330, the process 300 includes packaging a logical grouping of the one or more entities and the dependencies. The logical grouping can provide context for every invocation. The package can be sent, stored, or shared to the user. In some examples, the package can be imported into a remote server such that the one or more entities and the dependencies are created in the remote server such that the server-side application can run on the remote server. In some examples, packages can be combined.

In some examples, the package can include a description of the one or more entities for identification. The description can include a package name, a package version, a list of the one or more entities, and a purpose of the package that describes what the package is for. In some examples, the package can also include bindings that indicate entry points for user-defined code. The entry points can be for one or more APIs. As described above, the bindings can be metadata.

Figure 4:
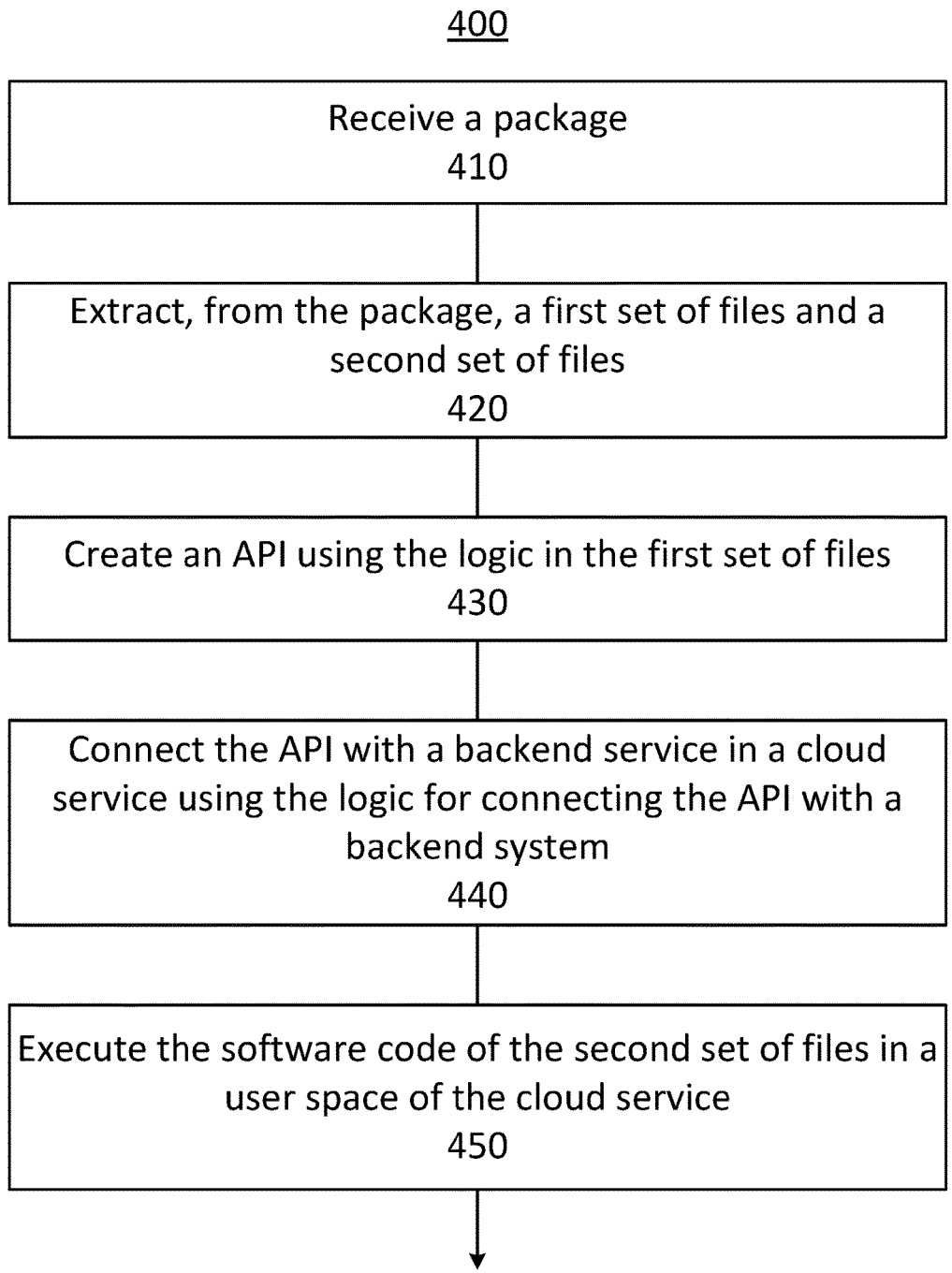
FIG. 4 is a flowchart illustrating an example of a process for installing a package of a server-side application.

FIG. 4 is a flowchart illustrating an example of a process 400 for installing a package of a server-side application. In some aspects, the process 400 can be performed by a mobile cloud service. Process 400 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 410, the process 400 includes receiving a package. The package can include a logical grouping of one or more entities. An entity can be a mobile backend, an API, an API implementation, a storage collection, and/or a connector. In some examples, the package can include a first set of files and a second set of files. The first set of files can have logic for creating an API (e.g., an API definition) and connecting the API with a backend service (e.g., a connector). The second set of files can have software code. The software code can be user-defined code (written in a high level programming language). The API can define entry points to the user-defined code. In some examples, the package can also include bindings that indicate how the API corresponds to the software code. For example, a binding can indicate that a call from the API causes a particular portion of the software code to be executed. The bindings can be metadata.

At step 420, the process 400 includes extracting, from the package, the first set of files and the second set of files. In some examples, the package can include at least two archive file packages. The contents of which are cross referenced with one another. Each archive file package can be associated with a different set of entities. In some examples, the different set of entities can be of a different type.

At step 430, the process 400 includes creating an API using the logic in the first set of files. The API can be created in a mobile cloud service environment. At step 440, the process 400 includes connecting the API with a backend service in a cloud service using the logic for connecting the API with a backend system.

At step 450, the process 400 includes executing the software code for the second set of files in a user space of the cloud service. The user space of the cloud service can be a target mobile cloud service environment.

Figure 5:
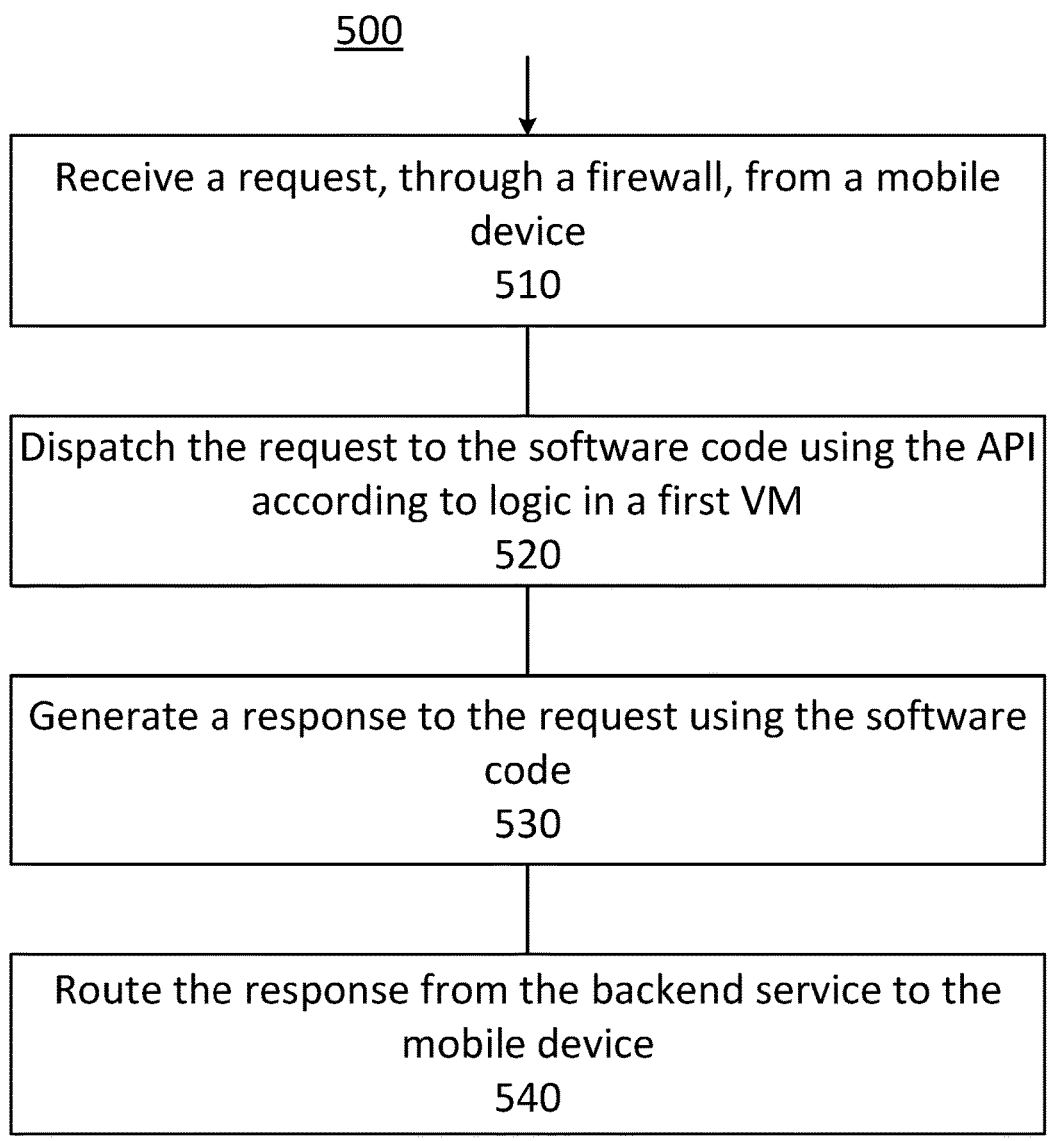
FIG. 5 is a flowchart illustrating an example of a process for responding to a request to a server-side application from a client-side application on a mobile device.

FIG. 5 is a flowchart illustrating an example of a process 500 for responding to a request to a server-side application from a client-side application on a mobile device. In some aspects, the process 500 can be performed by a mobile cloud service. Process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 510, the process 500 includes receiving a request, through a firewall, from a mobile device. The firewall can be associated with a mobile cloud service. In some examples, the request can be sent by a client-side application on the mobile device. The request can include an identifier of a backend system (or server-side application) that should handle the request. The request can be for content, processing, or some other operation that can be offloaded from the mobile device to a remote server.

At step 520, the process 500 includes dispatching the request to the software code using the API according to logic in a first virtual machine. In some examples, the API can connect with the backend service outside of the firewall. In some examples, the logic in the first virtual machine can handle initial resolution of a request to figure out where to dispatch the request. For example, the logic in the first virtual machine can identify a mobile backend associated with the request. The logic in the first virtual machine can also identify the API. In some examples, the request can be dispatched to a second virtual machine. The second virtual machine can be where the software code is executing. In some examples, the software code can be executing in a user sandbox area, isolated from other portions of the mobile cloud service.

At step 530, the process 500 includes generating a response to the request using the software code. The response can be based on logic in the software code. In some examples, the software code can use backend systems to generate the response. For example, the software code can use a database to receive information to use to respond to the request.

At step 540, the process 500 includes routing the response from the backend service to the mobile device. In some examples, the response is routed from the second virtual machine to the first virtual machine. The first virtual machine can then route the response to the client-side application on the mobile device.

Figure 6:
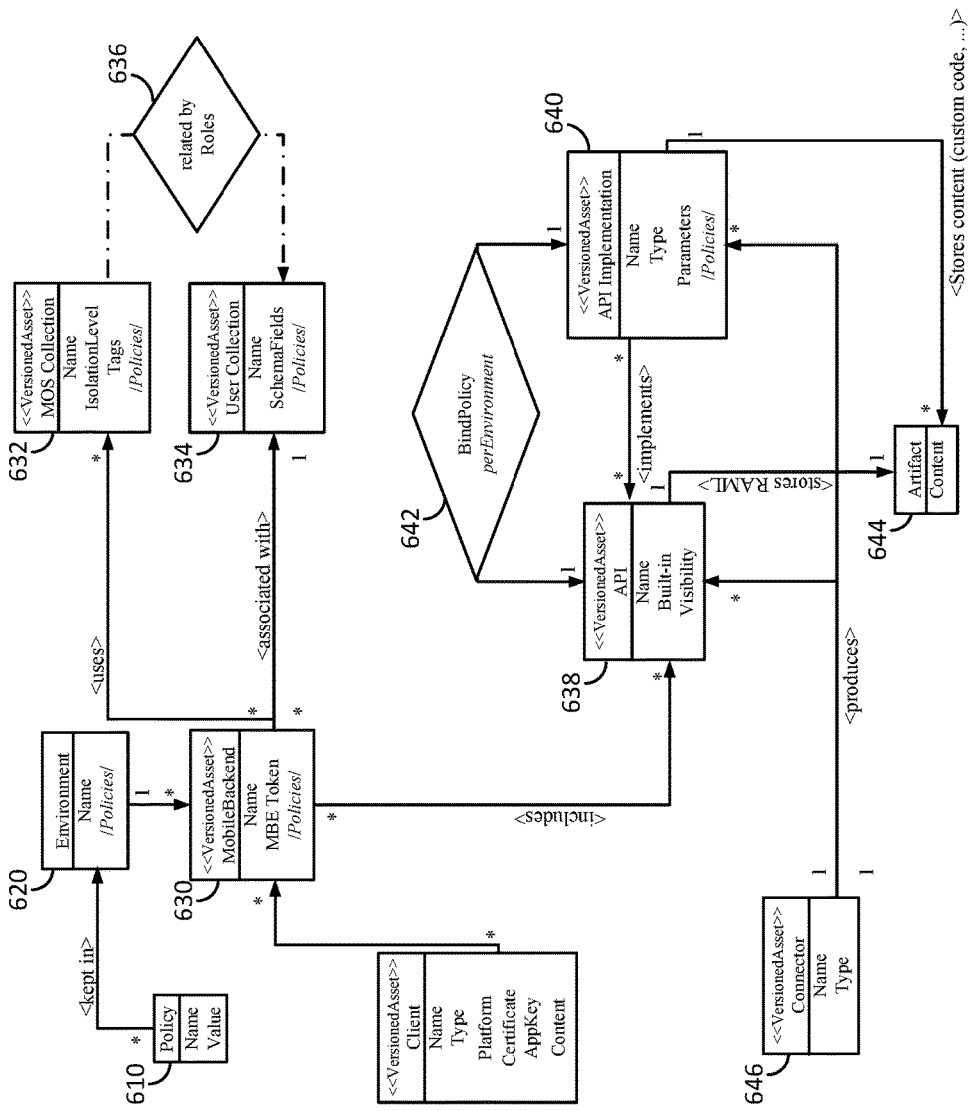
FIG. 6 illustrates an example of relationships between entities.

FIG. 6 illustrates an example of relationships between entities. In some examples, a package (as discussed above) can recreate the relationships between entities in a mobile cloud service environment such that the one or more entities can be exported and imported into different mobile cloud service environments.

The example of FIG. 6 includes a policy 620. The policy 620 can be an environment-specific configuration. The policy 620 can include one or more attributes (e.g., name and value). The name can be referenced in the metadata by given artifacts to add environment specific configuration. Examples of policies include session properties and environment properties. In some examples, the policy 620 can be selected automatically to correspond to one or more selected entities.

The policy 620 can be kept in an environment 620. The environment 620 can be associated to different types of environments that a customer can have. For example, the environment 620 can be a test, development, production, or other type of environment. In some examples, environments can be isolated from other environments. In some examples, environments can be self-contained (e.g., an environment can include all of its data in a database of the environment. In some examples, the environment 620 is not an entity, and cannot be selected nor included in a package. In such examples, the package is installed into an environment, which causes the environment 620 to be defined.

The policy 620 can be associated with a mobile backend 630. The mobile backend 630 can be an entity selected by a user or determined through the dependency analysis discussed above. The mobile backend 630 can include one or more attributes (e.g., name and mobile backend (MBE) token).

The mobile backend 620 can be associated with one or more storage collections (e.g., a mobile object store (MOS) collection 632 and user collection 634). In some examples, the mobile backend 620 can use the MOS collection 632. The MOS collection 632 can provide a storage container for the mobile backend 620. The MOS collection 632 can include a framework version number to ensure compatibility across mobile cloud service patches. The MOS collection 632 can provide a set of user defined named and versioned collections that are accessible via MOS APIs.

The one or more storage collections can be examples of instance data. Instance data can be environment specific run-time data. The instance data is typically created by a customer or framework code at runtime. In some examples, the instance data can be created at configuration time through the use of scripts or specially supported operations. Data inside of the one or more storage collections may or may not be exported with a package. The one or more storage collections can be selected by a user or determined through the dependency analysis discussed above.

In some examples, user data in MOS collection 623 can be related by roles to user data in the user collection 634. Such user data is not typically transferred when exporting the MOS collection 623.

The mobile backend 620 can include an API 638. In some examples, the API 638 can be defined by a RESTful API Modeling Language (RAML) document that resides in a metadata repository. The API 638 can store the RAML document in an artifact 644. The artifact 644 can be a system internally storing data. The software code, as described above, can also be stored in the artifact 644. The API 638 can be selected by a user or determined through the dependency analysis discussed above.

The API can include bindings 642 to an API implementation 640. The bindings 642 can indicate entry points for user-defined code. The entry points can be for one or more APIs. The bindings can be metadata. The bindings 642 can be included in metadata in a package.

The API implementation 640 can implement the API 638. For example, the API implementation 642 can provide actual implementation for a version of the API 638. In some examples, the API implementation 642 can be associated with the API 638 via the policy 610, resulting in an environment level association. Because an environment can have multiple mobile backends deployed, multiple versions of the same API can be deployed in the environment, resulting in multiple implementation versions being deployed and mapped (via a policy) at any time. The API implementation can be selected by a user or determined through the dependency analysis discussed above.

A connector 646 can produce the API 638 and/or the API implementation 640. The connector 646 can be a blend of APIs, configuration, and an associated service/custom code implementation. The connector 646 can be selected by a user or determined through the dependency analysis discussed above.

Figure 7:
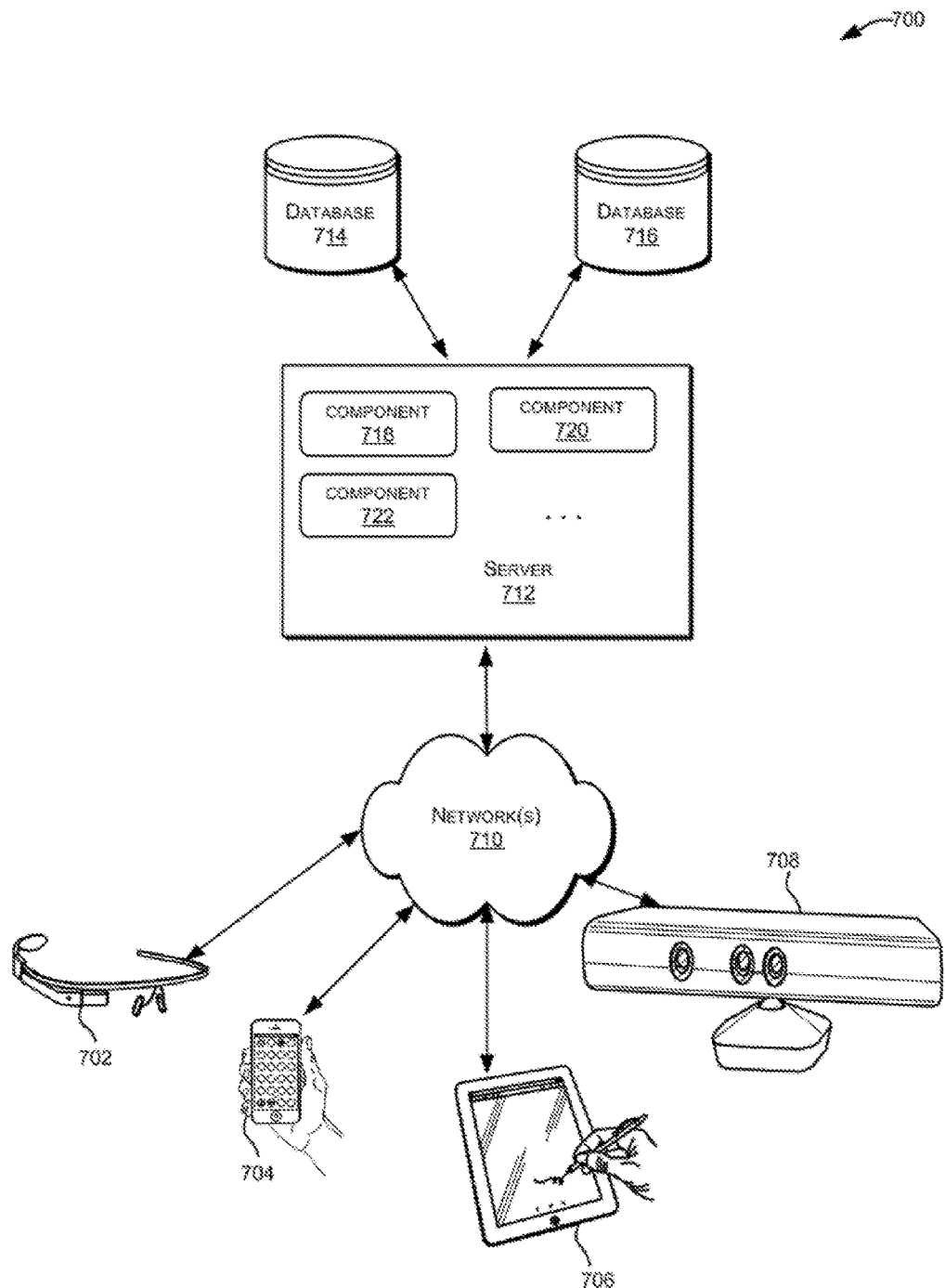
FIG. 7 depicts a simplified diagram of a distributed system.

FIG. 7 depicts a simplified diagram of a distributed system 700. Distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various examples, server 712 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some examples, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other examples, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 800. The example shown in the figure is thus one example of a distributed system for implementing an example system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various examples, server 712 may be adapted to run one or more services or software applications described in the foregoing disclosure. For example, server 712 may correspond to a server for performing processing described above according to an example of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of examples, databases 714 and 716 may reside in a storage-area network (SAN). Similarly, any necessary files for performing the functions attributed to server 712 may be stored locally on server 712 and/or remotely, as appropriate. In one set of examples, databases 714 and 716 may include relational databases, such as databases provided by Oracle, that are adapted to store, update, and retrieve data in response to SQL-formatted commands.

Figure 8:
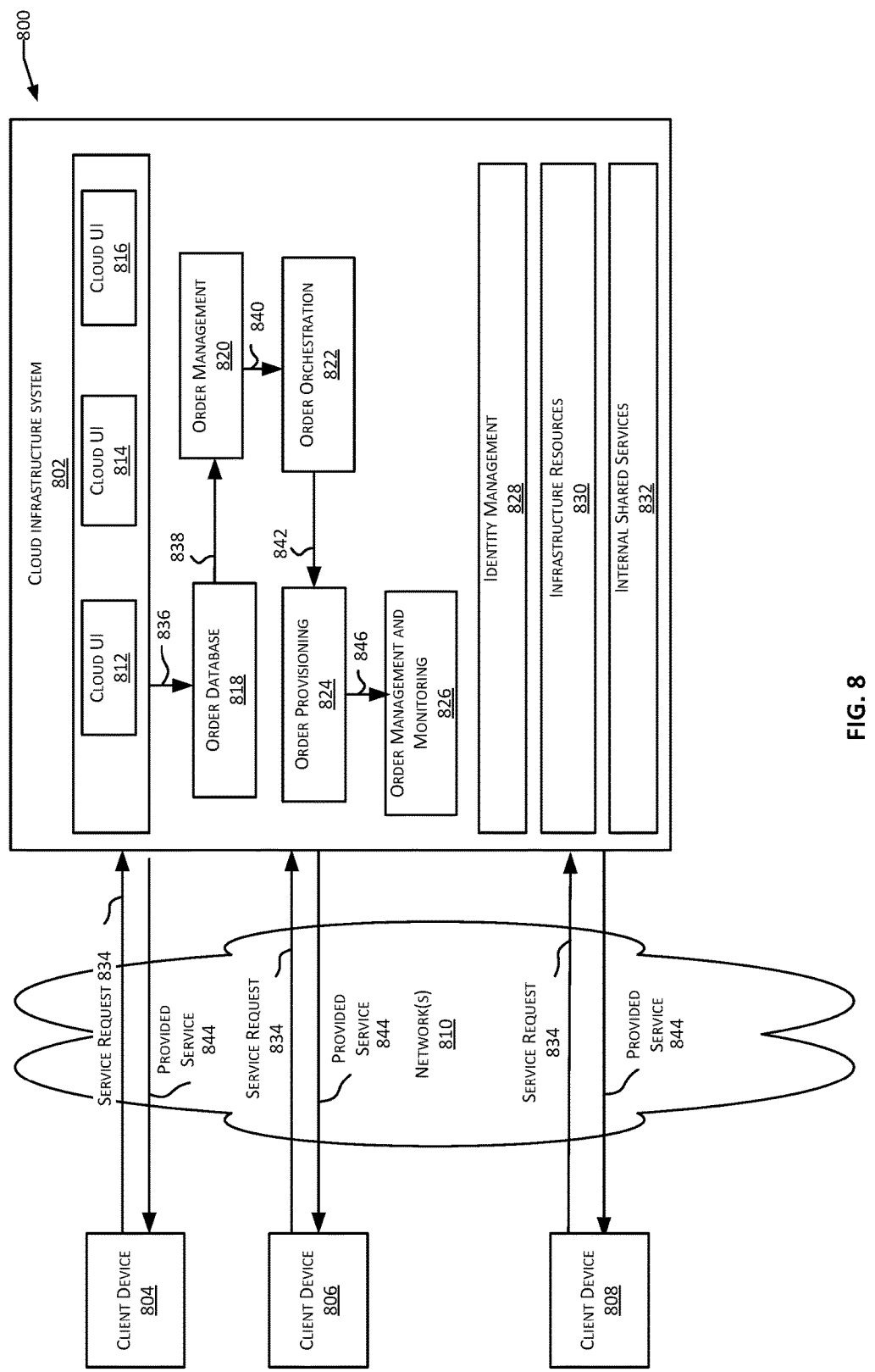
FIG. 8 is a simplified block diagram of components of a system environment by which services provided by the components may be offered as cloud services.

FIG. 8 is a simplified block diagram of one or more components of a system environment 800 by which services provided by one or more components may be offered as cloud services In the illustrated example, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the example shown in the figure is only one example of a cloud infrastructure system that may incorporate an example of this disclosure. In some other examples, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Although exemplary system environment 800 is shown with three client computing devices, any number of client computing devices may be include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain examples, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an example to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various examples, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some examples, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some examples, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some examples, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some examples, platform services provided by the cloud infrastructure system may include database cloud services, middleware cloud services (e.g., Oracle Fusion Middleware services), and Java cloud services. In one example, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain examples, cloud infrastructure system 802 may also include infrastructure resources 830 for providing the resources used to provide various services to customers of the cloud infrastructure system. In one example, infrastructure resources 830 may include pre-integrated and optimized combinations of hardware, such as servers, storage, and networking resources to execute the services provided by the PaaS platform and the SaaS platform.

In some examples, resources in cloud infrastructure system 802 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain examples, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain examples, cloud infrastructure system 802 may provide comprehensive management of cloud services (e.g., SaaS, PaaS, and IaaS services) in the cloud infrastructure system. In one example, cloud management functionality may include capabilities for provisioning, managing and tracking a customer's subscription received by cloud infrastructure system 802, and the like.

In one example, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain examples, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain examples, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain examples, cloud infrastructure system 800 may include an identity management module 828. Identity management module 828 may be configured to provide identity services, such as access management and authorization services in cloud infrastructure system 800. In some examples, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
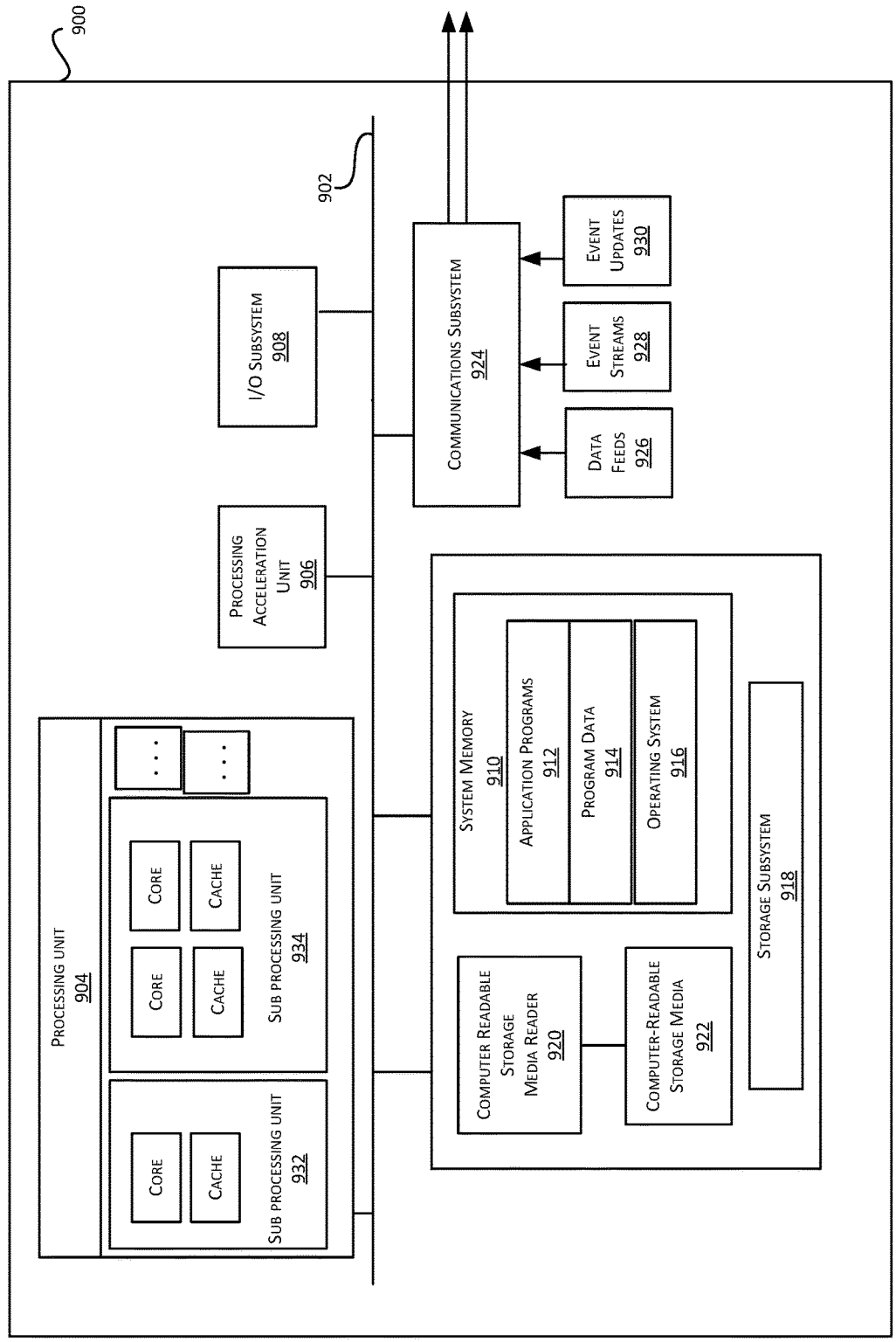
FIG. 9 illustrates an exemplary computer system by which services provided by one or more components may be offered as cloud services.

FIG. 9 illustrates an exemplary computer system 900, in which various examples of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative examples of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain examples, processing unit 904 may be implemented as one or more independent processing units 932 and/or 934 with single or multicore processors included in each processing unit. In other examples, processing unit 904 may also be implemented as a quad-core processing unit formed by integrating two dual-core processors into a single chip.

In various examples, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some examples. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some examples communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples communications subsystem 924 can provide wired network connectivity (e.g., Ethernet) in addition to or instead of a wireless interface.

In some examples, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various examples.

In the foregoing specification, aspects are described with reference to specific examples thereof, but those skilled in the art will recognize that the description is not limited thereto. Various features and aspects described above may be used individually or jointly. Further, examples can be utilized in any number of environments and applications beyond those described herein without departing from the broader spirit and scope of the specification. The specification and drawings are, accordingly, to be regarded as illustrative rather than restrictive.

What is claimed is:

1. A method for introducing a pre-formed instruction set to a mobile cloud service, the method comprising:
   receiving an archive file package, at a computing system executing within a mobile cloud service, wherein the mobile cloud service is protected by one or more firewalls from both (a) one or more mobile client devices, and (b) one or more backend systems;
   extracting, from the archive file package, a first set of files and a second set of files, the first set of files having logic for creating an application programming interface (API) and connecting the API with a connector within the mobile cloud service, the second set of files having custom software code;
   creating, by the computing system executing within the mobile cloud service, an API using the logic in the first set of files;
   connecting, by the computing system executing within the mobile cloud service, the API with the connector in the mobile cloud service using the logic for connecting the API with the connector, wherein the connector is configured to provide an interface to one or more backend services executing outside of the mobile cloud service;
   receiving, by the computing system executing within the mobile cloud service, a request from a mobile client device, the request including an identifier of a backend service;
   in response to the request from the mobile client device, (a) invoking the custom software code of the second set of files in an isolated execution space within the mobile cloud service, and (b) initiating one or more requests, via the connector, to one or more backend services executing outside of the mobile cloud service;
   generating, by the computing system executing within the mobile cloud service, a response to the request from the mobile client device, based on (a) output from the custom software code invoked within the isolated execution space of the mobile cloud service, and (b) responses to the requests to the one or more backend services; and
   routing, by the computing system executing within the mobile cloud service, the generated response to the mobile client device.

2. The method of claim 1, further comprising:
   dispatching the request to the custom software code using the API according to logic in a first virtual machine; and
   generating the response to the request using the custom software code, wherein the custom software code is in a second virtual machine.

3. The method of claim 2, wherein the request is sent by a client-side application on the mobile client device, through a first firewall.

4. The method of claim 1, wherein the archive file package comprises at least two separate file packages, the contents of which are cross referenced with one another.

5. The method of claim 1, wherein the request is received from the mobile client device through a first firewall, and wherein initiating the requests to the one or more backend services comprises transmitting the requests from the connector to the backend services through a second firewall separate from the first firewall.

6. The method of claim 1, wherein a single firewall encapsulates the mobile cloud service, wherein the request from the mobile client device is received through the single firewall, and wherein connector transmits requests to the one or more backend services through the same single firewall.

7. A system for introducing a pre-formed instruction set to a mobile cloud service, the system comprising:
one or more processors; and
a non-transitory computer-readable medium containing instructions that, when executed by the one or more processors, cause the one or more processors to perform operations including:
receive an archive file package, at the system while executing within a mobile cloud service, wherein the mobile cloud service is protected by one or more firewalls from both (a) one or more mobile client devices, and (b) one or more backend systems;
extract, from the an archive file package, a first set of files and a second set of files, the first set of files having logic for creating an application programming interface (API) and connecting the API with a connector within the mobile cloud service, the second set of files having custom software code;
create an API using the logic in the first set of files;
connect the API with the connector in the mobile cloud service using the logic for connecting the API the connector, wherein the connector is configured to provide an interface to one or more backend services executing outside of the mobile cloud service;
receive a request from a mobile client device, the request including an identifier of a backend service;
in response to the request from the mobile client device (a) invoke the custom software code of the second set of files in an isolated execution space within the mobile cloud service, and (b) initiate one or more requests, via the connector, to one or more backend services executing outside of the mobile cloud service;
generate a response to the request from the mobile client device, based on (a) output from the custom software code invoked within the isolated execution space of the mobile cloud service, and (b) responses to the requests to the one or more backend services; and
route the generated response to the mobile client device.

8. The system of claim 7, further comprising instructions that, when executed by the one or more processors, cause the one or more processors to perform operations including:
dispatch the request to the custom software code using the API according to logic in a first virtual machine; and
generate the response to the request using the custom software code, wherein the custom software code is in a second virtual machine.

9. The system of claim 8, wherein the request is sent by a client-side application on the mobile client device, through a first firewall.

10. The system of claim 8, wherein the archive file package comprises at least two separate file packages, the contents of which are cross referenced with one another.

11. The system of claim 7, wherein the request is received from the mobile client device through a first firewall, and wherein initiating the requests to the one or more backend services comprises transmitting the requests from the connector to the backend services through a second firewall separate from the first firewall.

12. The system of claim 7, wherein a single firewall encapsulates the mobile cloud service, wherein the request from the mobile client device is received through the single firewall, and wherein connector transmits requests to the one or more backend services through the same single firewall.

13. One or more non-transitory computer readable media storing one or more instructions that, upon execution by one or more processors, cause the one or more processors to:
receive an archive file package, at computer system executing within a mobile cloud service, wherein the mobile cloud service is protected by one or more firewalls from both (a) one or more mobile client devices, and (b) one or more backend systems;
extract, from the archive file package, a first set of files and a second set of files, the first set of files having logic for creating an application programming interface (API) and connecting the API with a connector within the mobile cloud service, the second set of files having custom software code;
create an API using the logic in the first set of files;
connect the API with the connector in the mobile cloud service using the logic for connecting the API the connector, wherein the connector is configured to provide an interface to one or more backend services executing outside of the mobile cloud service;
receive a request from a mobile client device, the request including an identifier of a backend service;
in response to the request from the mobile client device, (a) invoke the custom software code of the second set of files in an isolated execution space within the mobile cloud service, and (b) initiate one or more requests, via the connector, to one or more backend services executing outside of the mobile cloud service;
generate a response to the re quest from the mobile client device, based on (a) output from the custom software code invoked within the isolated execution space of the mobile cloud service, and (b) responses to the requests to the one or more backend services; and
route the generated response to the mobile client device.

14. The non-transitory computer readable media of claim 13, further storing one or more instructions that, upon executed by the one or more processors, cause the one or more processors to:
dispatch the request to the custom software code using the API according to logic in a first virtual machine; and
generate the response to the request using the custom software code, wherein the custom software code is in a second virtual machine.

15. The non-transitory computer readable media of claim 14, wherein the request is sent by a client-side application on the mobile client device, through a first firewall.

16. The non-transitory computer readable media of claim 14, wherein the archive file package comprises at least two separate file packages, the contents of which are cross referenced with one another.

17. The non-transitory computer readable media of claim 13, wherein the request is received from the mobile client device through a first firewall, and wherein initiating the requests to the one or more backend services comprises transmitting the requests from the connector to the backend services through a second firewall separate from the first firewall.

18. The non-transitory computer readable media of claim 13, wherein a single firewall encapsulates the mobile cloud service, wherein the request from the mobile client device is received through the single firewall, and wherein connector transmits requests to the one or more backend services through the same single firewall.

\* \* \* \* \*

UNITED STATES PATENT AND TRADEMARK OFFICE
CERTIFICATE OF CORRECTION

PATENT NO. : 10,306,023 B2
APPLICATION NO. : 15/335239
DATED : May 28, 2019
INVENTOR(S) : Mokeev et al.

It is certified that error appears in the above-identified patent and that said Letters Patent is hereby corrected as shown below:

In the Claims

In Column 29, Line 15, in Claim 7, delete "the an" and insert -- the --, therefor.

In Column 29, Line 29, in Claim 7, delete "device" and insert -- device, --, therefor.

In Column 30, Line 31, in Claim 13, delete "re quest" and insert -- request --, therefor.

Signed and Sealed this
Twenty-first Day of July, 2020

Andrei Iancu
*Director of the United States Patent and Trademark Office*